Patented Oct. 16, 1951

2,571,883

UNITED STATES PATENT OFFICE 2,571,883

2-METHYLENE-1,3-PROPYLENE DICHLORIDE HOMOPOLYMER

George E. Hulse, Wilmington, Del., assignor to Hercules Powder Company, Wilmington, Del., a corporation of Delaware No Drawing. Application October 28, 1948, Serial No. 57,134

3 Claims. (Cl. 260—654)

This invention relates to new polymeric materials and more specifically to polymers of 2-methylene-1,3-propylene dichloride.

In accordance with this invention it has been found that 2-methylene-1,3-propylene dichloride may be homopolymerized or copolymerized to produce new and valuable polymeric materials.

The following examples will illustrate the polymerization of 2-methylene-1,3-propylene dichloride in accordance with this invention. All parts and percentages are by weight unless otherwise indicated.

Example 1

An amount of benzoyl peroxide equal to 5% of the weight of 2-methylene-1,3-propylene dichloride used was dissolved in the latter and the solution was frozen in a Dry Ice bath. The container was evacuated, sealed, and then heated for 6 days at 65°–67° C. When opened, and any unpolymerized monomer removed, there was obtained an 83% yield of polymer which was a mixture of viscous liquid and crystalline material. After washing with a solution of sodium bicarbonate, followed by a water wash, and drying, the polymeric material was distilled at 1 mm. pressure and the following three main fractions were obtained:

| Fraction No. | Per Cent by Wt. | Boiling Range at 1 mm. | Description |
|---|---|---|---|
| | | °C | |
| 1 | 35 | 93–104 | White liquid. |
| 2 | 44 | 172–205 | Yellow liquid which crystallized. |
| 3 | 8 | 205–240 | Dark brown, viscous liquid. |

Analysis and molecular weight determinations showed Fraction 1 to be the dimer and Fraction 2 to be the trimer. The trimer on further purification was a white, crystalline solid melting at 117°–117.5° C.

Example 2

2-methylene-1,3-propylene dichloride was placed in a glass tube and the tube was evacuated and sealed. It was then exposed to ultraviolet light for 90 hours at a temperature of about 40° C. (a 250-watt bulb placed at a distance of 4 inches from the tube). The unpolymerized monomer was removed from the polymer-monomer mixture by heating to 60° C. under a pressure of 11 mm. The clear viscous liquid polymer which remained amounted to a yield of 43%.

Example 3

Example 2 was repeated except that 8 parts of a 30% solution of acetyl peroxide in dimethyl phthalate were added to 100 parts of the 2-methylene-1,3-propylene dichloride. After removal of any unpolymerized material, the yellow fluid polymer which remained amounted to a yield of 88%.

Example 4

Bulk polymerizations of 2-methylene-1,3-propylene dichloride were carried out using 5% benzoyl peroxide as catalyst (based on the weight of dichloride) at 65° C. and 80° C. An 82% yield of polymer was obtained after heating at 65° C. for 209 hours whereas an 81% yield was obtained in 71 hours at 80° C.

Example 5

A 10% solution of 2-methylene-1,3-propylene dichloride in benzene was charged into a polymerization vessel and an amount of benzoyl peroxide equal to 5% of the monomer weight was added. The vessel was equipped with a reflux condenser and swept out with nitrogen. The condenser outlet was then connected to a vertical tube, the other end of which dipped below the surface of a reservoir of mercury. In this way the system was sealed from the atmosphere without allowing any appreciable pressure to develop inside. The reaction mixture was then refluxed for 96 hours. The benzene was then removed and a 79% yield of liquid polymer was obtained, which polymeric material slowly crystallized on standing.

Example 6

To a mixture of 132 parts of redistilled maleic anhydride and 168 parts of 2-methylene-1,3-propylene dichloride was added an amount of benzoyl peroxide equal to 5% of the total monomer weight. The mixture was then frozen in a Dry Ice bath and the container evacuated and sealed. It was then heated for 19 hours at 50° C. followed by 144 hours at 65°–67° C. The product was separated into two polymer fractions by reprecipitation from a benzene solution into petroleum ether. One was a very viscous liquid having an average molecular weight of 339. The other was a white powder having a melting point of 90°–100° C. and an average molecular weight of 836. The latter polymeric material was soluble in benzene, methanol, and acetone and slightly soluble in petroleum ether, and hot or cold water. It was soluble in cold 10% sodium hydroxide and reprecipitated from the latter solution on acidification.

The 2-methylene-1,3-propylene dichloride which is polymerized in accordance with this invention may be prepared by chlorinating methallyl chloride at room temperature and then fractionating the mixture of dichloride isomers so obtained. It may also be prepared by the pyrolysis of 1,2,3-trichloro-2-methylpropane and fractionation of the two isomers so obtained.

The polymerization of 2-methylene-1,3-propylene dichloride may be carried out by homogeneous polymerization; i. e., either bulk or solution polymerization processes. If a solution process is used, the monomer or mixture of the monomer with one or more other polymerizable compounds is dissolved in a suitable solvent. Any solvent which is inert under the reaction conditions may be used as, for example, benzene, toluene, xylene, hexane, and the like.

The selfpolymerization or copolymerization reactions may be carried out by means of an organic peroxide as a catalyst. While it is possible to use ultraviolet light alone as the catalyst for the selfpolymerization of 2-methylene-1,3-propylene dichloride, much higher yields of polymer are obtained when a peroxide catalyst is also used. Typical peroxide catalysts which may be used for the homo- or co-polymerization are acetyl peroxide, lauroyl peroxide, benzoyl peroxide, tert.-butyl peroxide, etc. The concentration of peroxide may vary from about 0.1% to about 10%, based on the weight of monomer or monomers being polymerized, and preferably is at least about 1% to about 5%. The temperature at which the polymerization is carried out will depend upon the peroxide used, concentration of catalyst, whether a solvent is used, etc. In general, it will range from about 0° C. to about 200° C. and preferably from about 40° C. to about 80° C.

Compounds with which 2-methylene-1,3-propylene dichloride may be copolymerized are copolymerizable compounds which contain at least one ethylenic linkage such as a vinyl, vinylidene, or vinylene group. Of particular importance are compounds containing the latter group, specifically the alpha,beta-unsaturated dicarboxylic acids or derivatives thereof, such as maleic and fumaric acids, anhydrides, or esters. Exemplary of other copolymerizable compounds which may be used are the conjugated diolefins such as butadiene, isoprene, chloroprene, etc., vinyl aromatics such as styrene, halo-styrenes, alkyl-substituted styrenes, etc., acrylic and methacrylic acids and esters, vinyl esters, vinyl ethers and other monomers which form addition polymers, as well as monomer mixture of two or more of these monomers.

The polymers produced in accordance with this invention are in general of low molecular weight and being viscous liquids or soft resins are valuable plasticizers, particularly since they have a remarkable thermal stability. In addition, the chlorine in these polymers is stable and, therefore, they may be used in textile flameproofing agents. These polymers may also be hydrolyzed to yield polyhydric alcohols which are useful in the preparation of alkyd resins, etc.

What I claim and desire to protect by Letters Patent is:

1. A homopolymer of 2-methylene-1,3-propylene dichloride.

2. The process of preparing a homopolymer of 2-methylene-1,3-propylene dichloride which comprises homogeneously polymerizing the said dichloride in the presence of from about 0.1% to about 10% of an organic peroxide at a temperature of from about 0° C. to about 200° C.

3. The process of preparing a homopolymer of 2-methylene-1,3-propylene dichloride which comprises heating a mixture of said dichloride and from about 1% to about 5% of an organic peroxide to a temperature of about 40° C. to about 80° C.

GEORGE E. HULSE.

REFERENCES CITED

The following references are of record in the file of this patent:

UNITED STATES PATENTS

| Number | Name | Date |
|---|---|---|
| 2,042,222 | Groll | May 26, 1936 |
| 2,498,084 | Kuderna | Feb. 21, 1950 |